Nov. 7, 1961 G. HOFFMANN 3,007,943
METHOD FOR THE PURIFICATION OF TETRACHLOROPHTHALIC
ACID AND THE ANHYDRIDE THEREOF
Filed Feb. 4, 1958
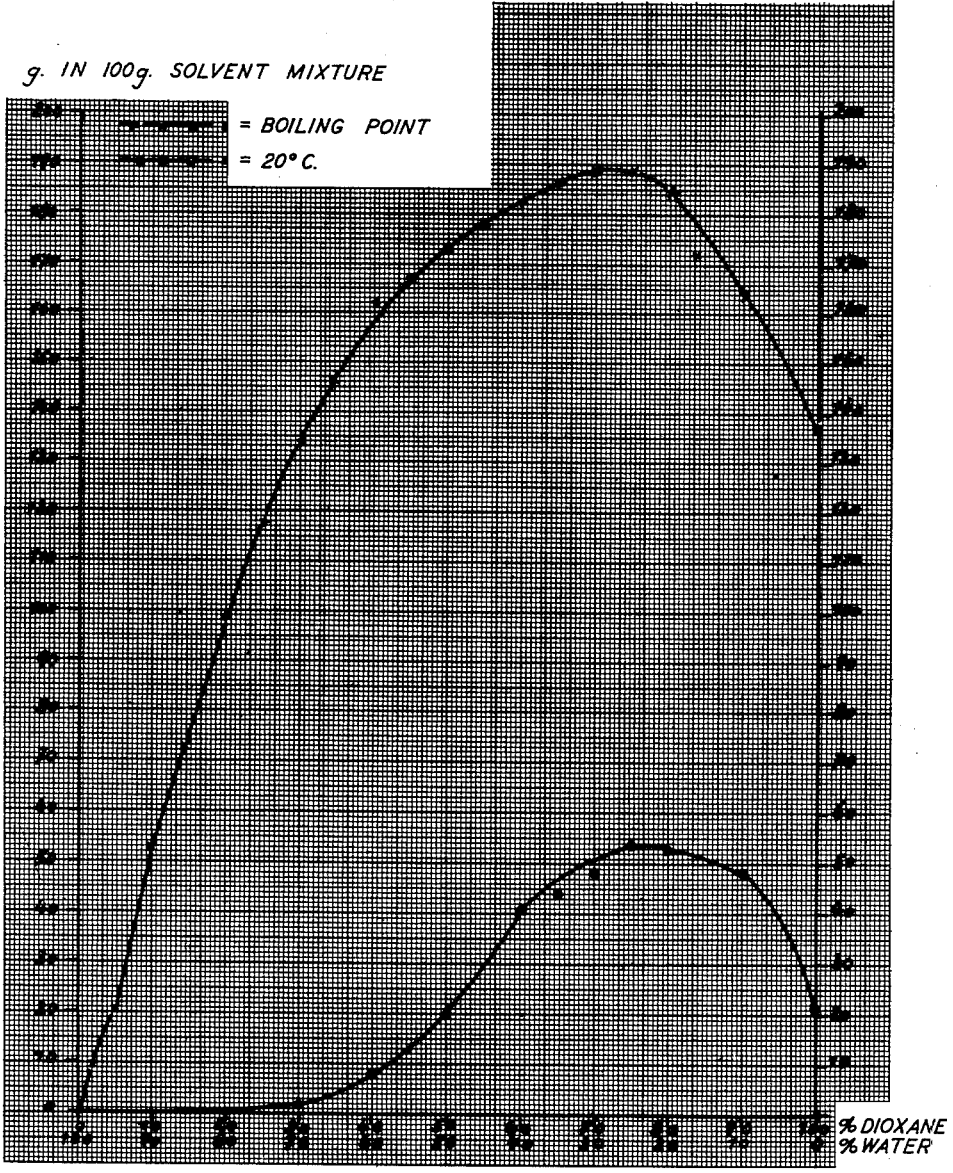
SOLUBILITY OF TETRACHLOROPHTHALIC ACID IN A MIXTURE OF DIOXANE AND WATER.
Inventor
GERHART HOFFMANN
By Dicke and Craig
Attorneys.

United States Patent Office 3,007,943
Patented Nov. 7, 1961

3,007,943
METHOD FOR THE PURIFICATION OF TETRA-
CHLOROPHTHALIC ACID AND THE ANHY-
DRIDE THEREOF
Gerhart Hoffmann, Witten, Germany, assignor to Chemische Werke Witten, Witten (Ruhr), Germany
Filed Feb. 4, 1958, Ser. No. 713,258
Claims priority, application Germany Feb. 4, 1957
8 Claims. (Cl. 260—346.3)

The invention relates to a method for the purification of tetrachlorophthalic acid or tetrachlorophthalic anhydride by recrystallization.

In the chlorination of phthalic anhydride to form tetrachlorophthalic anhydride an impure product is formed which must be thoroughly purified in order that it may be used for industrial purposes. Since the boiling point of this product is 366° C. and its melting point is 255° C., fractionated distillation is difficult to carry out and in addition, it does not give satisfactory results.

While in principle recrystallization from water would be possible in practice it is not feasible. The solubility of tetrachlorophthalic anhydride in water at 100° C. is only 2.8% and thus large quantities of water would be required or alternatively it would be necessary to carry out the recrystallization under pressure.

On the other hand, the usual organic solvents are also unsuitable for recrystallization for various reasons. In the case of carbon tetrachloride or acetone, the solubility is too low. In the case of benzene or chlorobenzene the temperature coefficient of solubility is too small.

It is an object of the present invention to provide a solvent suitable for the purification, by recrystallization, of tetrachlorophthalic acid or tetrachlorophthalic anhydride.

It is a further object of the present invention to provide a process for the successful purification of tetrachlorophthalic acid or tetrachlorophthalic anhydride.

These and other objects of the invention are achieved in the method for the purification of a compound selected from the group consisting of tetrachlorophthalic acid and tetrachlorophthalic anhydride by recrystallization, which method comprises carrying out the recrystallization at elevated temperatures, usually though not essentially about 100° C., and using, as the solvent, a solution of water and a water-soluble, hydroxyl-free organic compound selected from the group consisting of ethers, ketals, and acetals.

Thus, according to this invention, it has now been found that the solubility of tetrachlorophthalic acid in water at 100° C. is increased many fold by adding thereto water-soluble, hydroxyl-free ethers, acetals or ketals to water. Nevertheless at about 20° C. the solubility of tetrachlorophthalic acid in water does not change greatly even when up to 20–30% of such a water-soluble organic compound is added thereto. Tetrachlorophthalic anhydride may also be purified in the same way since, on heating in water or in the solvent solution of the present invention it is converted to tetrachlorophthalic acid. It follows, therefore, that high yields of tetrachlorophthalic acid or tetrachlorophthalic anhydride may be recrystallized from the solvent of the present invention. The purifying effect is excellent.

The ether, acetal or ketal which may be used in the present invention should be sufficiently water soluble to result in a water-organic compound solvent solution containing a sufficient amount of the organic compound, and should also be free of hydroxyl groups. If the compound is an ether, there may be one or more ether-groups in the molecule. Ethers, acetals or ketals having boiling points in the range of between about 50 and about 100° C. are preferred. Lower boiling organic compounds are difficult to recover from their aqueous solutions since organic compounds which boil at too low a temperature have too small a temperature difference between the dissolution and crystallization temperatures. While all such organic compounds having these characteristics are opperative, the acetals of acetaldehyde and the ketals of acetone are not as practical for use since they are not very stable in the presence of tetrachlorophthalic acid.

Examples of suitable such organic compounds having the above noted properties include:

Dioxane

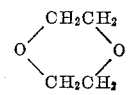

Methylal

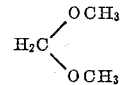

Ethylal

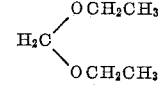

Tetrahydrofuran

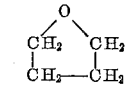

Glycol acetal

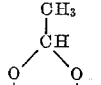

Glycol formal

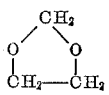

And 1,3-dioxane

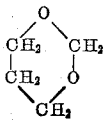

The drawing consists of a graph plotted with percent dioxane-water as abscissa and grams of tetrachlorophthalic acid per 100 grams of solvent plotted as ordinate showing the solubility of tetrachlorophthalic acid in a solvent solution consisting of dioxane and water. It is seen that a 10% addition of dioxane to the water at 100° C. raises solubility of the tetrachlorophthalic acid to 50 gm. per 100 gm. of the solvent solution, whereas at 20° C. the solubility of tetrachlorophthalic acid in water remains less than 1% up to a dioxane concentration of 25%.

Tetrahydrofuran, methylal, ethylal, glycol acetal, glycol formal and 1,3-dioxane show similar effects when used in the solvent of the present invention. For example: at its boiling temperature, 100 gm. of a solvent consisting of 90 parts water and 10 parts by weight tetrahydrofuran dissolves 65 gm. of tetrachlorophthalic acid; at its boiling temperature, a solvent consisting of 90 parts water and 10 parts by weight glycol formal dissolves 70 gm. of tetrachlorophthalic acid; and at its boiling temperature a solvent consisting of 90 parts water and 10 parts by weight glycol acetal dissolves 25 gm. of tetrachlorophthalic acid.

The sharp increase in the temperature coefficient of solubility of tetrachlorophthalic acid in water due to addition of the above-mentioned class of compounds to form the solvent solution of the present invention is very surprising. It was found that related compounds, such as other more highly halogenated aromatic carboxyl acids, e.g. tetrachloroterephthalic acid or pentachlorobenzoic acid and phthalic acid itself are not more soluble in the hot aqueous solvent solution of the present invention. This phenomenon is believed to be a unique specific property of tetrachlorophthalic acid. This is of fundamental importance in the method of the present invention since the unusual purification effect obtained by recrystallization of tetrachlorophthalic acid or tetrachlorophthalic anhydride from the aqueous solvent solution of the present invention is believed to be attributable to this property.

The recrystallization of tetrachlorophthalic acid is usually, though not essentially carried out with a solvent solution containing 2–20% by volume ether, ketal or acetal in the water. Preferably the organic reagent is used in amounts 10–20% by volume in excess relative to the quantity needed in order to dissolve the tetrachlorophthalic acid; the excess serves to prevent premature crystallization of the acid on the filter. If the solvent is to be recovered, which is preferred in the case where relatively large solutions of ethers, ketals or acetals are employed, a considerably larger excess of solvent mixture may be used; this will not significantly decrease the yield, especially where 10–20% ether, ketal or acetal solutions are employed. In many cases a better purification effect can be achieved in this way through the use of such solutions. It is of course also possible to use as a solvent, a solution of water with mixtures of various ethers and/or acetals and/or ketals.

A favourable effect on the purity and colour of the purified crystalline tetrachlorophthalic acid is often realized if, prior to filtration adsorbents such as activated carbon or fuller's earth are added to the hot solution. Thus, one subsidiary feature of the present invention resides in the addition of adsorbents to the dissolved tetrachlorophthalic acid in the hot aqueous solvent solution of the present invention, prior to the filtration thereof.

Inorganic salts such as iron chloride, which is used as a chlorination catalyst, and which may be present as an impurity in the so-formed tetrachlorophthalic acid may be retained in the solution by adding acids, e.g. hydrochloric acid to the aqueous solvent solution. Thus, a further subsidiary feature of this invention involves the use of a solvent solution of water, a water-soluble hydroxyl-free ether, ketal, or acetal, and an acid. The acid concentration in this case should be not greater than 2 N. Under these conditions also it is advisable to use acid-stable ethers, such as dioxane, as solvents.

Recovery of the solvents added to the water can generally be achieved by continuous or batch-wise distillation of the mother liquor, either with or without the prior step of neutralization. In most cases, the ethers, ketals or acetals involved, form an azeotropic solution with water. Such azeotrope may then be used as the solvent in the recrystallization process.

The process of the present invention makes it possible to produce, in a simple manner with good yields and with the degree of purity required for industrial purposes, tetrachlorophthalic anhydride which may be used in the plastics and dye industries.

The following examples are given to illustrate the present invention.

*Example I*

1 kg. impure finely divided tetrachlorophthalic anhydride (saponification number 388), obtained by chlorination of phthalic anhydride in the presence of $FeCl_3$ as a catalyst, was treated with dilute hydrochloric acid to remove the $FeCl_3$, and was washed with water. It was then dissolved in 6 l. of a solution of 5 parts by volume dioxane and 95 parts by volume water to which 20 gm. of activated carbon were added, by heating. The solution was filtered hot. After cooling to room temperature the precipitated crystals were filtered by suction, washed five times with 100 cc. water and dried at 90° C. The crystals then had an acid number of 358, which corresponded to the hemihydrate of tetrachlorophthalic acid. After drying at 150° C., an 88% yield of tetrachlorophthalic anhydride based on the amount of impure tetrachlorophthalic anhydride without $FeCl_3$ was obtained. The purified tetrachlorophthalic anhydride had a saponification number of 391.5 and a melting point of 254.8° C.

*Example II*

1 kg. impure tetrachlorophthalic anhydride purified with respect to $FeCl_3$ was dissolved in 3 l. of a solution of 20 parts by volume dioxane and 80 parts by volume water by heating. The solution was then filtered hot. After cooling to room temperature, the precipitated crystals were filtered by suction and were washed with 100 cc. of a 20% dioxane solution and four times with 100 cc. water. After drying at 150° C. tetrachlorophthalic anhydride was obtained in 94% yield, having a saponification number of 390 and a melting point of 254.5° C.

To recover the dioxane, the mother liquor was fractionated in a packed column using a reflux ratio of 1:3. The dioxane distilled at 87.8° C. in the form of an azeotropic solution with water (81.6% dioxane+18.4% water). The amount recovered was 85% of the original dioxane used.

*Example III*

1 kg. of impure tetrachlorophthalic anhydride was dissolved in 6.7 l. of a solution of 5 parts by volume glycol formal and 95 parts by volume water by heating. The solution was filtered hot. After the filtrate had been cooled to room temperature, the precipitated crystals were filtered by suction and washed 5 times with 200 cc. of water. After drying at 150° C. a 90.0% yield of tetrachlorophthalic anhydride was obtained. It had a saponification number of 392 and a melting point of 254.0° C. 80% of the glycol formal used was recovered by the fractional distillation of the mother liquor.

*Example IV*

1 kg. of impure tetrachlorophthalic anhydride was dissolved in 6.7 l. of a solution of 5 parts by volume tetrahydrofuran and 95 parts by volume of water by heating. The solution was filtered hot. After cooling the filtrate to room temperature, the precipitated crystals were filtered by suction and washed five times with 200 cc. water. After drying at 150° C. an 89.5% yield of tetrachlorophthalic anhydride was obtained. The pure anhydride had a saponification number of 390 and a melting point of 254.3° C. 75% of the tetrahydrofuran employed was recovered by fractional distillation from the mother liquor.

*Example V*

1 kg. impure tetrachlorophthalic anhydride containing about 3% $FeCl_3$ was dissolved in 5 l. of a solution of 10 parts by volume dioxane and 90 parts by volume of a 2% hydrochloric acid solution to which 10 gm. activated carbon had been added. The mixture was boiled and refluxed for fifteen minutes and then filtered hot. After cooling the filtrate to room temperature, the precipitated crystals were filtered by suction and washed 10 times with 200 cc. water. After drying at 150° C., an 88.5% yield, relative to the impure anhydride containing the $FeCl_3$ of pure white tetrachlorophthalic anhydride was obtained. The anhydride had a saponification number of 391.0 and a melting point of 254.6° C.

Example VI 0.5 kg. of a first-run product obtained by the distillation of impure tetrachlorophthalic anhydride, having a saponification number of 368, were boiled and refluxed for one half hour in 2.5 l. of a solution of 10 parts by volume dioxane and 90 parts by volume water. The solution was filtered hot. After the filtrate had been cooled to room temperature, the precipitated crystals were filtered by suction and washed five times with 200 cc. water. After drying at 150° C., an 86.5% yield of tetrachlorophthalic anhydride was obtained, having a saponification number of 391.5 and a melting point of 254.5° C.

Example VII 1 kg. tetrachlorophthalic acid having an acid number of 358 was boiled and refluxed for 10 minutes in 5 l. of a solution of 10 parts by volume dioxane and 90 parts by volume water and filtered hot. After the filtrate had cooled to room temperature, the precipitated crystals were filtered by suction and washed five times with 200 cc. water. After drying at 150° C., an 88% yield of tetrachlorophthalic anhydride, relative to he original tetrachlorophthalic acid, was obtained, having a saponification number of 392 and a melting point of 254.5° C.

Example VIII 1 kg. of tetrachlorophthalic acid was dissolved in 6.7 l. of a solution of 5 parts by volume glycol formal and 95 parts by volume water and filtered hot. After the filtrate had been cooled to room temperature, the precipitated crystals were filtered by suction and washed five times with 200 cc. water . After drying at 150° C., an 85% yield of tetrachlorophthalic anhydride, relative to the original tetrachlorophthalic acid, was obtained having a saponification number of 392 and a melting point of 254.4° C. 80% of the original glycol was recovered by fractional distillation of the mother liquor.

What is claimed is:

1. A method for the purification of a compound selected from the group consisting of tetrachlorophthalic acid and tetrachlorophthalic anhydride products of the chlorination of phthalic anhydride, which method comprises dissolving said compound in a solvent mixture containing water and between about 2–20% of an organic solvent selected from the group consisting of dioxane, glycol formal and tetrahydrofuran, the solvent mixture being at a temperature near the boiling point thereof, cooling the solution to precipitate crystals of the compound substantially free of impurities, and thereafter separating the precipitated crystals from the mother liquid.

2. The method of claim 1, wherein the organic solvent is dioxane.

3. The method of claim 1, wherein the organic solvent is glycol formal.

4. The method of claim 1, wherein the organic solvent is tetrahydrofuran.

5. A method for the purification of a compound selected from the group consisting of tetrachlorophthalic acid and tetrachlorophthalic anhydride products of the chlorination of phthalic anhydride, which method comprises dissolving said compound in a solvent mixture containing water and between about 2–20% of an organic solvent selected from the group consisting of dioxane, glycol formal and tetrahydrofuran, the solvent mixture being at a temperature near the boiling point thereof, adding an absorbent selected from the group consisting of activated carbon and Fuller's earth to the hot solvent mixture, filtrating the hot solvent mixture, cooling the hot solvent mixture to precipitate crystals of the compound substantially free of impurities, and thereafter separating the precipitated crystals from the mother liquid.

6. A method for the purification of a compound selected from the group consisting of tetrachlorophthalic acid and tetrachlorophthalic anhydride products of the chlorination of phthalic anhydride, which method comprises dissolving said compound in a solvent mixture consisting of water, a mineral acid, and between about 2–20% of an organic solvent selected from the group consisting of dioxane, glycol formal and tetrahydrofuran, cooling the solution to precipitate crystals of the compound substantially free of impurities, and thereafter separating said crystals from the mother liquid.

7. A method for the purification of a compound selected from the group consisting of tetrachlorophthalic acid and tetrachlorophthalic anhydride products of the chlorination of phthalic anhydride, which method comprises dissolving said compound in a solvent mixture containing water and between about 2–20% of an organic solvent selected from the group consisting of dioxane, glycol formal and tetrahydrofuran, cooling the solution to precipitate crystals of the compound substantially free of impurities, and thereafter separating the crystals of the mother liquid and subjecting the crystal-free mother liquid to a distillation step to remove from the solvent mixture said organic solvent for re-use thereof.

8. A method for the purification of a compound selected from the group consisting of tetrachlorophthalic acid and tetrachlorophthalic anhydride products of the chlorination of phthalic anhydride, which method comprises dissolving said compound in a solvent mixture consisting of water, a mineral acid, and between about 2–20% of an organic compound selected from the group consisting of dioxane, glycol formal, and tetrahydrofuran, the solvent mixture being at a temperature near the boiling point thereof, cooling the solution to precipitate crystals of the compound substantially free of impurities, and thereafter separating the crystals from the mother liquid and subjecting the crystal-free mother liquid to a distillation step in order to remove from the solvent mixture said organic solvent for re-use thereof.

References Cited in the file of this patent

UNITED STATES PATENTS 2,547,504    Steahly _____ Apr. 3, 1951

OTHER REFERENCES

Lawlor: Ind. and Eng. Chem., vol. 39, #11, pp. 1424–26 (1947).

Weissberger et al.: Technique of Organic Chemistry, vol. III (1950), pp. 474 and 480.